US007904021B2

(12) United States Patent
Yonge, III

(10) Patent No.: US 7,904,021 B2
(45) Date of Patent: Mar. 8, 2011

(54) SELECTING CARRIERS FOR MODULATING SIGNALS IN A COMMUNICATION NETWORK

(75) Inventor: Lawrence W. Yonge, III, Ocala, FL (US)

(73) Assignee: Atheros Communications, Inc., San Jose, CA (US)

( * ) Notice: Subject to any disclaimer, the term of this patent is extended or adjusted under 35 U.S.C. 154(b) by 962 days.

(21) Appl. No.: 11/614,729

(22) Filed: Dec. 21, 2006

(65) Prior Publication Data

US 2008/0153430 A1 Jun. 26, 2008

(51) Int. Cl.
*H04B 1/00* (2006.01)
*H04B 17/00* (2006.01)
*H04B 7/00* (2006.01)
*H03C 1/62* (2006.01)

(52) U.S. Cl. ............ 455/39; 455/62; 455/67.11; 455/69; 455/115.1; 455/513

(58) Field of Classification Search .................... 455/69, 455/67.11, 67.13, 115.1, 102, 226.1, 226.2, 455/452.2, 513, 62
See application file for complete search history.

(56) References Cited

U.S. PATENT DOCUMENTS 6,160,443 A * 12/2000 Maalej et al. ................. 329/304
6,278,685 B1 8/2001 Yonge, III et al.
6,289,000 B1 9/2001 Yonge, III
6,647,250 B1 11/2003 Bultman et al.
7,684,756 B2 * 3/2010 Bohnke et al. .................. 455/45
2002/0015477 A1 2/2002 Geile et al.
2002/0105901 A1 8/2002 Chini et al.
2003/0016123 A1 * 1/2003 Tager et al. .............. 340/310.01
2003/0133473 A1 7/2003 Manis et al.
2004/0009783 A1 * 1/2004 Miyoshi ........................ 455/522
2005/0058089 A1 * 3/2005 Vijayan et al. ................ 370/312
2005/0078803 A1 * 4/2005 Wakisaka et al. ............ 379/1.01
2005/0099938 A1 5/2005 Sarraf et al.
2005/0135312 A1 6/2005 Montojo et al.
2005/0163067 A1 * 7/2005 Okamoto et al. ............. 370/321
2006/0083205 A1 4/2006 Buddhikot et al.
2006/0126493 A1 * 6/2006 Hashem et al. ............... 370/208
2006/0256881 A1 * 11/2006 Yonge et al. .................. 375/260

OTHER PUBLICATIONS

PCT International Search Report for Application No. PCT/US06/29818; dated Sep. 21, 2007.
International Search Report dated Apr. 30, 2008 referencing PCT Application No. PCT/US07/85189, 12 pages.
"Programmable PSD Mask", V1.1.1 (Feb. 2006); Proposed Technical Specification, European Telecommunications Standards Institute, available prior to Jun. 2006.

* cited by examiner

*Primary Examiner* — Simon D Nguyen
(74) *Attorney, Agent, or Firm* — Fish & Richardson P.C.

(57) ABSTRACT

Communicating over a network of communication stations includes monitoring for reception of an electromagnetic wave that has a power above a threshold and a frequency in a predetermined frequency interval, and selecting carrier frequencies for modulating information onto signals transmitted over the network. The carrier frequencies are selected based at least in part on whether an electromagnetic wave having a power above the threshold and a frequency in the frequency interval has been received in a predetermined time interval, and based at least in part on a demand by one or more stations in the network for capacity for communicating over the network.

40 Claims, 2 Drawing Sheets

SELECTING CARRIERS FOR MODULATING SIGNALS IN A COMMUNICATION NETWORK

TECHNICAL FIELD

The invention relates to selecting carriers for modulating signals in a communication network.

BACKGROUND

Various types of communication systems transmit signals that may radiate in a portion of the electromagnetic spectrum and cause interference with devices that operate in that portion of the electromagnetic spectrum (e.g., radio frequency (RF) spectral bands). In some cases regulatory requirements for certain geographical regions (e.g., imposed by governments) place constraints on power that may be radiated in certain spectral regions, such as amateur radio bands. Some systems are wireless systems that communicate between stations using radio waves modulated with information. Other systems are wired systems that communicate using signals transmitted over a wired medium, but the wired medium may radiate enough power in restricted spectral bands to potentially cause interference.

Communication stations can be configured to avoid using or limit the amount of power that is radiated in certain restricted spectral bands. Alternatively, communication stations can be configured to adjust the spectral regions used for communication, based on whether the station is operating in an environment in which interference may occur. For example, orthogonal frequency division multiplexing (OFDM), also known as Discrete Multi Tone (DMT), is a spread spectrum signal modulation technique in which the available bandwidth is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM).

SUMMARY

In one aspect, in general, the invention features a method for communicating over a network of communication stations. The method includes monitoring for reception of an electromagnetic wave that has a power above a threshold and a frequency in a predetermined frequency interval. The method also includes selecting carrier frequencies for modulating information onto signals transmitted over the network. The carrier frequencies are selected based at least in part on whether an electromagnetic wave having a power above the threshold and a frequency in the frequency interval has been received in a predetermined time interval, and based at least in part on a demand by one or more stations in the network for capacity for communicating over the network.

In another aspect, in general, the invention features an apparatus. The apparatus includes a monitoring module including circuitry for monitoring for reception of an electromagnetic wave that has a power above a threshold and a frequency in a predetermined frequency interval. The apparatus includes a modulation module including circuitry for modulating information onto signals transmitted over a network. The apparatus includes a carrier selection module including circuitry to select carrier frequencies for use by the modulation module. The carrier frequencies are selected based at least in part on whether an electromagnetic wave having a power above the threshold and a frequency in the frequency interval has been received in a predetermined time interval, and based at least in part on a demand by one or more stations in the network for capacity for communicating over the network.

Aspects of the invention may include one or more of the following features.

The demand for capacity by a station comprises a request for transmission of data from the station at a rate that exceeds an available capacity over a communication medium shared by multiple stations in the network.

The method further includes ensuring that carrier frequencies in the frequency interval are not selected for modulating information onto signals transmitted over the network if an electromagnetic wave having a power above the threshold and a frequency in the frequency interval has been received in the predetermined time interval.

The method further includes ensuring that carrier frequencies in the frequency interval that are not selected for modulating information onto signals transmitted over the network are not used to transmit more than a tenth of the power transmitted using selected carrier frequencies.

The monitoring comprises monitoring for reception of one or more qualified electromagnetic waves that have a power above a threshold and a frequency in one of multiple predetermined frequency intervals in the predetermined time interval.

A given carrier frequency in a subset of carrier frequencies is selected for modulating information onto signals transmitted over the network if no qualified electromagnetic wave is received in a corresponding frequency interval that includes the given carrier frequency and if at least one station demands capacity for communicating over the network.

The method further includes terminating use of the given carrier frequency for modulating information onto signals transmitted over the network if a qualified electromagnetic wave is received in a corresponding frequency interval that includes the given carrier frequency or if remaining demand for capacity can be satisfied without using the given carrier frequency.

The method further includes ensuring that the carrier frequencies in the subset that are not selected for modulating information onto signals transmitted over the network are not used to transmit more than a tenth of the power transmitted using selected carrier frequencies.

The method further includes transmitting from a first station in the network to at least one other station in the network information characterizing the demand for capacity.

The information characterizing the demand for capacity comprises information characterizing a demand for capacity by the first station.

The monitoring comprises monitoring for reception of one or more qualified electromagnetic waves that have a power above a threshold and a frequency in one of multiple predetermined frequency intervals in the predetermined time interval.

A given carrier frequency in a subset of carrier frequencies is selected for modulating information onto signals transmitted over the network if no qualified electromagnetic wave is received in a corresponding frequency interval that includes the given carrier frequency.

The method further includes terminating use of the given carrier frequency for modulating information onto signals transmitted over the network if a qualified electromagnetic wave is received in a corresponding frequency interval that includes the given carrier frequency.

The selected carrier frequencies in the subset are used for modulating a first category of information onto signals transmitted over the network and are not used for modulating a second category of information onto signals transmitted over the network.

The first category comprises information that is unicast to one other station.

The first category comprises information that is modulated onto a signal using a modulation format that is adapted to a communication channel between two stations.

The second category comprises information that is broadcast to all stations in the network.

The second category comprises preamble or overhead information modulated onto signals transmitted over the network.

The selected carrier frequencies in the subset are used to modulate information according to a predetermined encoding that does not depend on which carrier frequencies in the subset are selected for modulating information.

The predetermined encoding includes interleaving data in a manner that does not depend on which carrier frequencies in the subset are selected for modulating information.

At least some carrier frequencies not in the subset of carrier frequencies are used to modulate information according to a predetermined encoding that does not depend on which carrier frequencies in the subset are selected for modulating information.

The predetermined encoding includes interleaving data in a manner that does not depend on which carrier frequencies in the subset are selected for modulating information.

The carrier frequencies not in the subset are used for modulating information onto signals transmitted over the network regardless of whether any qualified electromagnetic waves is received in any frequency intervals.

The selected carrier frequencies in the subset are used for modulating redundant information that corresponds to the information modulated on the carrier frequencies not in the subset.

The selected carrier frequencies in the subset are used for modulating the redundant information if the information modulated on the carrier frequencies not in the subset is being broadcast to multiple stations in the network.

The selected carrier frequencies in the subset are used for modulating information onto signals sent by a subset of the stations.

The subset of the stations comprises stations that transmit the largest amount of data over the network.

The subset of the stations comprises stations that transmit data over the network for the largest amount of time.

The subset of the stations comprises stations that use the largest amount of a capacity over a communication medium shared by multiple stations in the network.

The method further includes transmitting from first a station in the network to at least one other station in the network information indicating whether an electromagnetic wave having a power above the threshold and a frequency in the frequency interval has been received.

The information indicates whether the electromagnetic wave has been received at the first station.

Each station in the network monitors for reception of an electromagnetic wave that has a power above a threshold and a frequency in a predetermined frequency interval.

Selecting the carrier frequencies is performed in a distributed process by multiple of the stations in the network.

A first station selects the carrier frequencies and broadcasts information specifying the selected carrier frequencies to other stations in the network.

The first station selects the carrier frequencies based on whether the electromagnetic wave has been received at the first station.

The first station selects the carrier frequencies based on whether the electromagnetic wave has been received at a station other than the first station.

Transmitting signals over the network comprises transmitting signals over a wired communication medium.

The wired communication medium comprises a powerline network.

The electromagnetic wave comprises a radio wave.

The predetermined frequency interval comprises an amateur radio band.

The radio wave has a frequency within a band regulated by a government agency.

Among the many advantages of the invention (some of which may be achieved only in some of its various aspects and implementations) are the following.

The adaptive carrier selection technique can be used to provide additional carriers to increase communication capacity in response to a demand for such capacity when the additional carriers are not likely to interfere with a licensed operator (e.g., an amateur radio operator). Since there are a limited number of amateur operators, only some of which may actually use the frequencies of the additional carriers, the additional carriers can often be used without causing interference. These additional "reserved carriers" may be used under certain conditions. By encoding certain communication symbols such as preamble, frame control and robust mode symbols without using the reserved carriers, the system maintains interoperability among stations regardless of the status of the reserved carriers.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
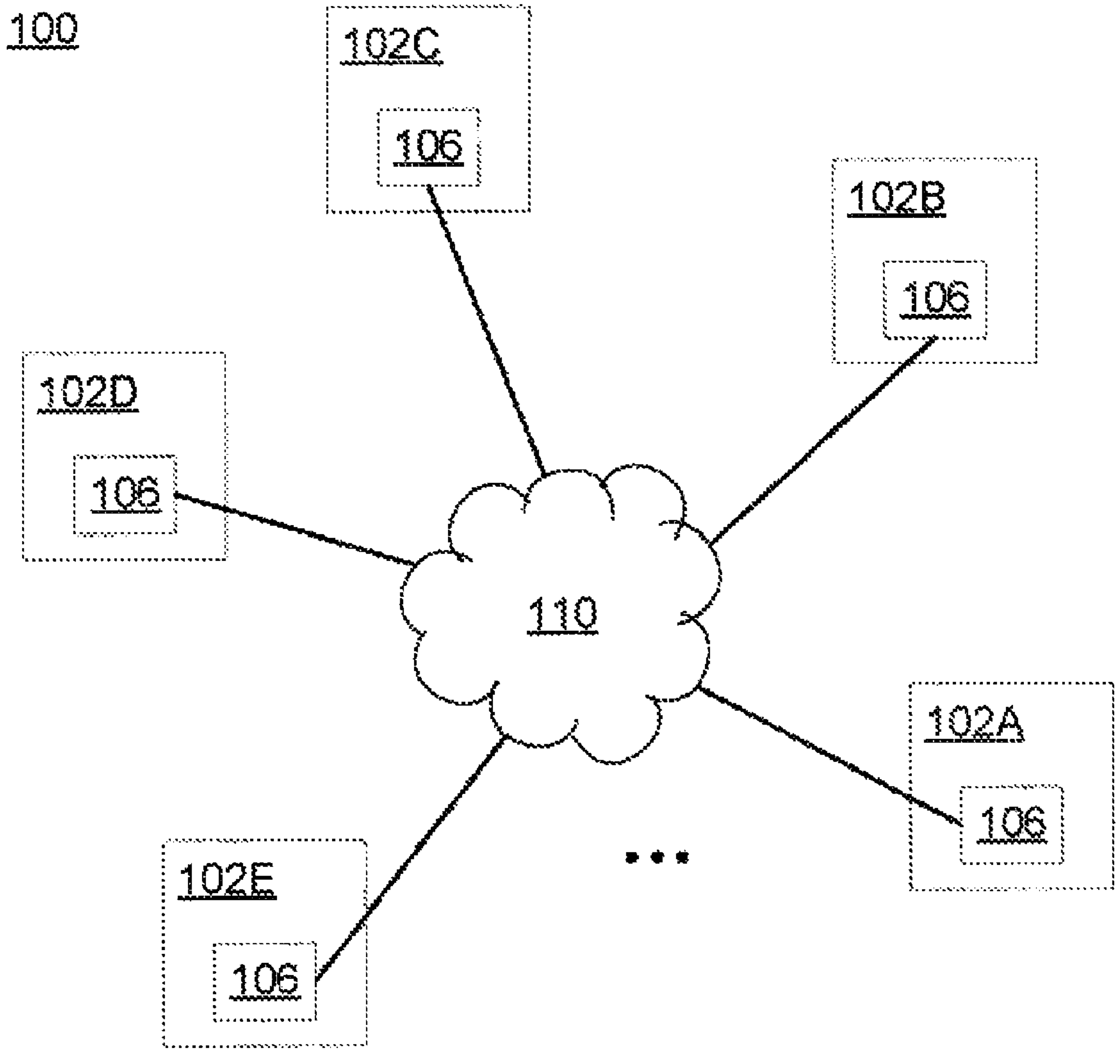
FIG. 1 is a schematic diagram of a network configuration.

As shown in FIG. 1, a network 100 provides a shared communication medium 110 for a number of communication stations 102A-102E (e.g., computing devices, or audiovisual devices) to communicate with each other. The communication medium 110 can include one or more types of physical communication media such as coaxial cable, unshielded twisted pair, power lines, or wireless channels for example. The network 100 can also include devices such as bridges or repeaters. The communication stations 102A-102E communicate with each other using predetermined physical (PHY) layer and medium access control (MAC) layer communication protocols used by network interface modules 106. The MAC layer is a sub-layer of the data link layer and provides an interface to the PHY layer, according to the Open Systems Interconnection (OSI) network architecture standard, for example. The network 100 can have any of a variety of network topologies (e.g., bus, tree, star, mesh).

In some implementations, the network interface modules 106 use protocols that include features to improve performance when the network 100 includes a communication medium 110 that exhibits varying transmission characteristics. For example, the communication medium 110 may include AC power lines in a house, optionally coupled to other media (e.g., coaxial cable lines).

Power-line communication systems use existing AC wiring to exchange information. Owing to their being designed for much lower frequency transmissions, AC wiring provides varying channel characteristics at the higher frequencies used for data transmission (e.g., depending on the wiring used and the actual layout). To increase the data rate between various links, stations adjust their transmission parameters dynamically. This process is called channel adaptation. Channel adaptation results in adaptation information specifying a set of transmission parameters that can be used on each link. Adaptation information includes such parameters as the frequencies used, their modulation, and the forward error correction (FEC) used.

The communication channel between any two stations provided by the communication medium 110 may exhibit varying channel characteristics such as periodic variation in noise characteristics and frequency response. To improve performance and QoS stability in the presence of varying channel characteristics, the stations can synchronize channel adaptation with the frequency of the AC line (e.g., 50 or 60 Hz). There are typically variations in the phase and frequency of the AC line cycle from the power generating plant and local noise and load changes. This synchronization enables the stations to use consistent channel adaptation optimized for a particular phase region of the AC line cycle. An example of such synchronization is described in U.S. patent application Ser. No. 11/337,946, incorporated herein by reference.

Another aspect of mitigating potential impairments caused by the varying channel characteristics involves using a robust signal modulation format such as OFDM. An exemplary communication system that uses OFDM modulation is described below.

Any of a variety of communication system architectures can be used to implement the portion of the network interface module 106 that converts data to and from a signal waveform that is transmitted over the communication medium. An application running on a station provides and receives data to and from the network interface module 106 in segments. A "MAC Protocol Data Unit" (MPDU) is a segment of information including overhead and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line.

In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f = 1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth. The stations use an adaptive carrier selection technique, described in more detail below, to select carriers for transmitting data based on monitoring electromagnetic spectral regions and monitoring demand for communication capacity.

Figure 2:
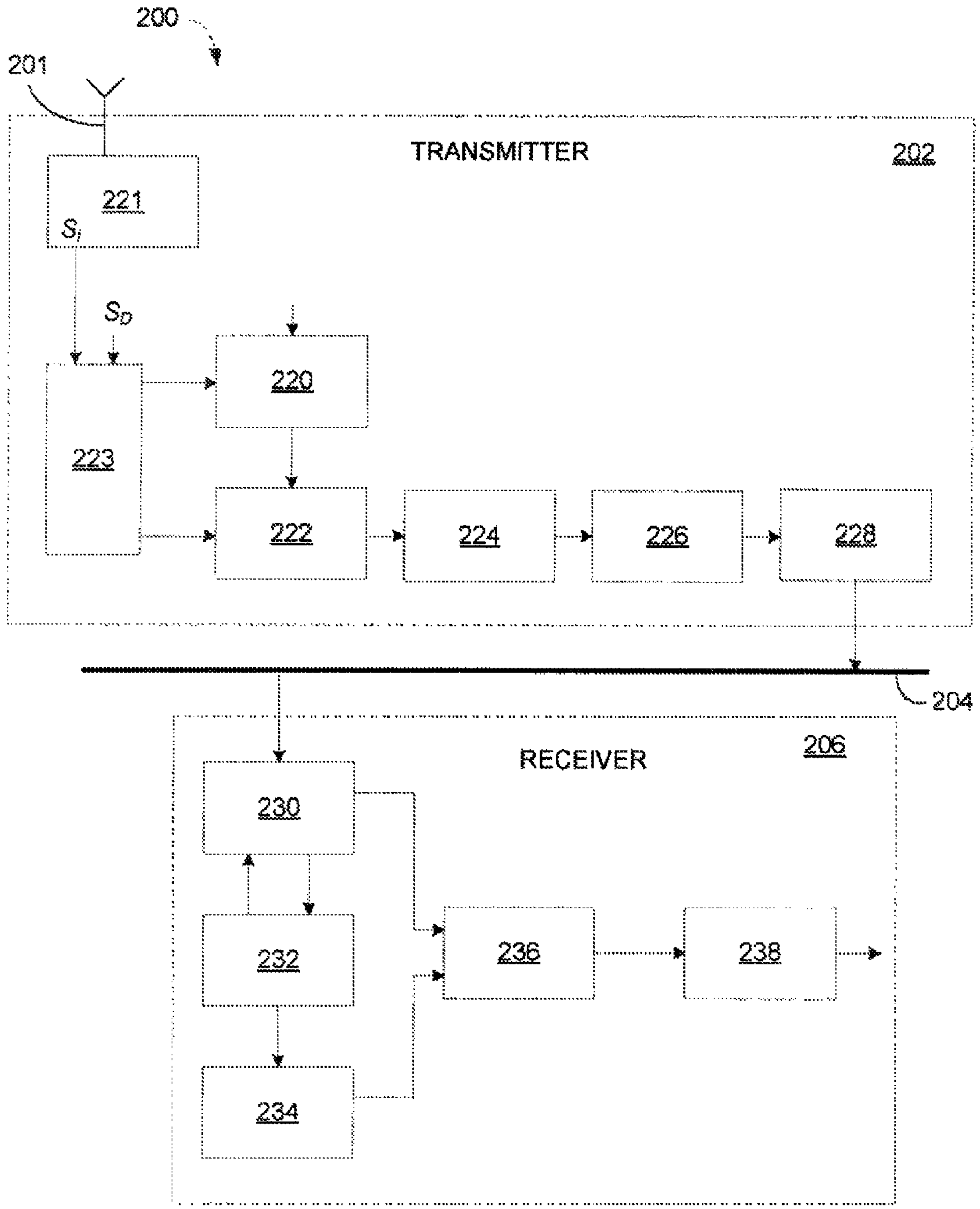
FIG. 2 is a block diagram of a communication system.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module 106 at each station. The communication medium 204 represents a path from one station to another over the communication medium 110 of the network 100. A wireless system 200 includes an antenna for transmitting and receiving signals over a free space path between stations. The antenna can also be used to enable a monitoring module 221 to monitor for received electromagnetic waves. A wired system 200 (e.g., that communicates over power lines) may not need an antenna for transmitting signals, but can include an antenna 201 that enables a monitoring module 221 to monitor for received electromagnetic waves.

At the transmitter 202, modules implementing the PHY layer receive an MPDU from the MAC layer. The MPDU is sent to an encoder module 220 to perform processing such as scrambling, error correction coding and interleaving. The encoder module 220 can provide redundancy to enable each portion of an MPDU to be recovered from fewer than all of the modulated carriers or fewer than all of the modulated symbols.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

A carrier selection module 223 adaptively selects carrier frequencies $f_1, \ldots, f_N$ (or "tones") within the OFDM bandwidth that are to be used by the system 200 to transmit information according to a "tone mask." A default tone mask excludes carrier frequencies that are likely to interfere with licensed entities in a particular region (e.g., North America). Devices sold in a given region can be programmed to use a default tone mask configured for that region.

The carrier selection module 223 can turn on any of a set of "reserved carriers" when there is no indication that a licensed entity is operating within a frequency interval that includes the reserved carrier frequency in the vicinity of the station. An "extended tone mask" is formed by turning on one or more of the reserved carriers. The carrier selection module 223 can send to the encoder module 220 and to the mapping module 222 any number of extended tone masks to be used at different times or for different symbols within an MPDU. The encoder module 220 can use the extended tone mask to determine how data is to be interleaved. The mapping module 222 can use the extended tone mask to determine how data values are to be mapped to carrier waveforms.

The carrier selection module 223 receives input signals that are used to determine whether a given reserved carrier is to be used. One input signal indicates whether it is likely that a given reserved carrier can be used without causing interference to a licensed entity operating in the vicinity of the station. To determine this likelihood, the monitoring module 221 monitors reception of any electromagnetic waves that may be transmitted from such an entity within one or more "reserved frequency intervals" that include the reserved carrier frequencies. For example, the reserved frequency intervals can be narrowband intervals surrounding each reserved carrier, or reserved frequency intervals can include multiple reserved carriers that are turned on or off in sets. The monitoring module 221 generates a signal $S_i$ for each monitored reserved frequency interval that indicates whether a "qualified electromagnetic wave" with a power above a predetermined threshold and a frequency in the reserved frequency interval has been received in the past T hours. In some cases, the time window T is a short time interval such as 0.5 hour, 1 hour, 2 hours, etc. In some cases, if it is not necessary to have a fast response to preventing potential interference, the time window T can be a longer time interval such as one or more days or weeks. The time window T can be different for different reserved frequency intervals.

Another input signal $S_D$ characterizes a demand for communication capacity from one or more stations in the network. Each station can repeatedly broadcast information about whether the station has a request for transmission of data from the station at a rate that exceeds a currently available capacity over the shared communication medium 110 using the current tone mask(s). For example, a station may have a request to transmit or receive a video stream that would consume more capacity than is available. Each station can transmit a logical signal $S_d$ that is true if that station has a demand for communication capacity. The signal $S_D$ can then be calculated as the logical OR operation performed on the individual $S_d$ signals.

When $S_i$ indicates that no qualified electromagnetic wave has been received for a given reserved frequency interval and $S_D$ indicates that there is a demand for more capacity, the one or more carrier frequencies within the reserved frequency interval are added to an extended tone mask. In networks that have a central controller (CCo) station that coordinates communication on the network, the CCo station can make this determination and broadcast the new extended tone mask to the other stations in the network. Alternatively, the CCo station may broadcast the new extended tone mask to only those stations occupying significant portions of time on the shared communication medium 110 (e.g., to limit the use of the reserved carriers to those stations that would benefit most from the extra capacity provided by the reserved carriers). If the extended tone mask is sent to stations, those stations do not necessarily need to have a carrier selection module 223. Alternatively, if each station does have a carrier selection module 223, the CCo station can broadcast the $S_i$ and $S_D$ input signals and each station can determine the extended tone mask based on these signals from the CCo station. In some networks, multiple stations in the network can monitor reception of qualified electromagnetic waves in each reserved frequency interval and send the monitoring results to the CCo station to increase the reliability of detecting the waves (e.g., a wave may have a low power just above the threshold which can be detected by a station in one portion of the network, but not by the CCo station).

Other protocols for determining an extended tone mask can be used that do not necessarily require a CCo station. For example, in networks without a CCo station (e.g., a CSMA network) stations can occasionally broadcast information characterizing reception of qualified electromagnetic waves and demand for capacity so that the decision about whether to include a given reserved carrier in the extended tone mask is made using a distributed algorithm (e.g., distributed consensus algorithms). Additionally, a pair of stations in the network 100 may choose to use reserved carriers in an extended tone mask based on their reception (or lack thereof) of one or more qualified electromagnetic waves and their demand for capacity, independently of the other stations. It is not necessary that the stations inform other stations of the extended tone mask, but there may be cases where communicating the extended tone mask to other stations may be useful. In some implementations, in a network 100 that includes a CCo station, the CCo can allow the option for individual pairs of communicating stations to select an extended tone mask for use between that pair of stations.

When the additional network capacity provided by one or more reserved carriers is no longer needed a new tone mask can be generated without those carriers. Also, if a qualified electromagnetic wave is received with a frequency in a reserved frequency interval while corresponding reserved carriers in that interval are being used in an extended tone mask, a new tone mask can be generated without the corresponding reserved carriers.

To increase reliability and interoperability, certain communication symbols such as symbols carrying overhead information (e.g., preamble symbols and frame control symbols), and symbols carrying information broadcast to all stations (e.g., robust mode symbols) can be encoded and modulated using the default tone mask without any reserved carriers regardless of whether or not any other station is using an extended tone mask. Alternatively, certain communication symbols can be encoded and modulated to make use of the reserved carriers only for communicating redundant information that is not required for correctly demodulating and decoding the symbols.

One technique that facilitates interoperability for certain communication symbols includes using a predetermined encoding that does not depend on which reserved carrier frequencies are selected for inclusion in the extended tone mask. For example, the encoder module 220 interleaves data in a manner that does not depend on which reserved carrier frequencies are used. The interleaving can include all reserved carriers regardless of whether the carrier is selected, and can ensure that only redundant information (e.g., copies or parity bits) is mapped to the reserved carriers. Thus, a station can demodulate and decode information from a given default carrier frequency or a given reserved carrier frequency without necessarily knowing which reserved carriers may have been selected for modulating information in the extended tone mask. A station can demodulate and decode information without using any reserved carriers, or a station can use one or more reserved carriers to obtain redundant information that may be used, for example, to correct errors.

The mapping module 222 also determines the type of modulation to be used on each of the carriers in the tone mask according to a "tone map." The tone map can be a default tone map (e.g., for redundant broadcast communication among multiple stations), or a customized tone map determined by a receiving station that has been adapted to characteristics of the communication medium 204 (e.g., for more efficient unicast communication between two stations). If a station determines (e.g., during channel adaptation) that a carrier in the tone mask is not suitable for use (e.g., due to fading or noise) the tone map can specify that the carrier is not to be used to modulate data, but instead can use pseudorandom noise for that carrier (e.g., coherent BPSK modulated with a binary value from a Pseudo Noise (PN) sequence). For two stations to communicate, the transmitted symbols should use the same tone mask and tone map, or the stations should at least know what tone mask and tone map the other station is using so that the symbols can be demodulated properly. In some networks, a pair of stations that performs channel adaptation do determine a tone map may also decide to turn on one or more reserved carriers in a reserved frequency interval in which no qualified electromagnetic wave has been detected to establish an extended tone mask to be used just for unicast communication between the two stations, as described above. Other stations using a different extended tone mask or the default tone mask would not need to know that extended tone mask established by those stations.

A modulation module 224 performs the modulation of the resulting set of N complex numbers (some of which may be zero for unused carriers) determined by the mapping module 222 onto N orthogonal carrier waveforms having peak frequencies $f_1, \ldots, f_N$. The modulation module 224 performs an inverse discrete Fourier transform (IDFT) to form a discrete time symbol waveform S(n) (for a sampling rate $f_R$), which can be written as $$S(n) = \sum_{i=1}^{N} A_i \exp[j(2\pi in/N + \Phi_i)] \quad \text{Eq. (1)}$$

where the time index n goes from 1 to N, $A_i$ is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. For example, in a wired system the communication medium 204 supports propagation of an electrical signal over a wire between stations, and in a wireless system the communication medium 204 supports propagation of electromagnetic waves through paths between antennas of stations. The effect of the transmission of the continuous-time version of the waveform S(t) over the communication medium 204 can be represented by convolution with a function $g(\tau;t)$ representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including deinterleaving, error correction, and descrambling). The data that was modulated onto carriers that were subsequently attenuated by the spectral shaping module 400 can be recovered due to the redundancy in the encoding scheme.

The adaptive carrier selection technique can be used in combination with the amplitude mask technique described in U.S. application Ser. No. 11/493,382, incorporated herein by reference. For example, the reserved carriers can be included in a master tone mask for all symbols and selectively turned on or off, as described herein, using the amplitude mask. The amplitude mask specifies an attenuation factor $\alpha$ for the amplitude $A'_i=\alpha A_i$ according to the amount by which the power is to be attenuated (e.g., 2 dB in amplitude for each 1 dB in power). The amplitude $A'_i$ is set below a predetermined amplitude that is normally used for modulating the information (e.g., according to a predetermined constellation) such that the resulting radiated power does not interfere with other devices. The amplitude mask entry may also indicate that a carrier is to be nulled completely with the corresponding amplitude set to zero. The attenuated carriers can still be processed by the receiving station even if they are transmitted with zero amplitude so that the modulation and encoding scheme is preserved.

Any of the modules of the communication system 200 including modules in the transmitter 202 or receiver 206 can be implemented in hardware, software, or a combination of hardware and software.

Many other implementations of the invention other than those described above are within the invention, which is defined by the following claims.

What is claimed is:

1. A method for communicating over a network of communication stations, comprising:

monitoring for reception of an electromagnetic wave that has a power above a threshold and a frequency in a predetermined frequency interval; and selecting carrier frequencies for modulating information onto signals transmitted over the network, based at least in part on a demand by one or more stations in the network for capacity for communicating over the network, and ensuring that carrier frequencies in the frequency interval are not selected for modulating information onto signals transmitted over the network if an electromagnetic wave having a power above the threshold and a frequency in the frequency interval has been received in a predetermined time interval.

2. The method of claim 1, wherein the demand for capacity by a station comprises a request for transmission of data from the station at a rate that exceeds an available capacity over a communication medium shared by multiple stations in the network.

3. The method of claim 1, further comprising ensuring that carrier frequencies in the frequency interval that are not selected for modulating information onto signals transmitted over the network are not used to transmit more than a tenth of the power transmitted using selected carrier frequencies.

4. The method of claim 1, wherein the monitoring comprises monitoring for reception of one or more qualified electromagnetic waves that have a power above a threshold and a frequency in one of multiple predetermined frequency intervals in the predetermined time interval.

5. The method of claim 4, wherein a given carrier frequency in a subset of carrier frequencies is selected for modulating information onto signals transmitted over the network if no qualified electromagnetic wave is received in a corresponding frequency interval that includes the given carrier frequency and if at least one station demands capacity for communicating over the network.

6. The method of claim 5, further comprising terminating use of the given carrier frequency for modulating information onto signals transmitted over the network if a qualified electromagnetic wave is received in a corresponding frequency interval that includes the given carrier frequency or if remaining demand for capacity can be satisfied without using the given carrier frequency.

7. The method of claim 5, further comprising ensuring that the carrier frequencies in the subset that are not selected for modulating information onto signals transmitted over the network are not used to transmit more than a tenth of the power transmitted using selected carrier frequencies.

8. The method of claim 4, wherein a given carrier frequency in a subset of carrier frequencies is selected for modulating information onto signals transmitted over the network if no qualified electromagnetic wave is received in a corresponding frequency interval that includes the given carrier frequency.

9. The method of claim 8, further comprising terminating use of the given carrier frequency for modulating information onto signals transmitted over the network if a qualified electromagnetic wave is received in a corresponding frequency interval that includes the given carrier frequency.

10. The method of claim 8, wherein the selected carrier frequencies in the subset are used for modulating a first category of information onto signals transmitted over the network and are not used for modulating a second category of information onto signals transmitted over the network.

11. The method of claim 10, wherein the first category comprises information that is unicast to one other station.

12. The method of claim 10, wherein the first category comprises information that is modulated onto a signal using a modulation format that is adapted to a communication channel between two stations.

13. The method of claim 10, wherein the second category comprises information that is broadcast to all stations in the network.

14. The method of claim 10, wherein the second category comprises preamble or overhead information modulated onto signals transmitted over the network.

15. The method of claim 8, wherein the selected carrier frequencies in the subset are used to modulate information according to a predetermined encoding that does not depend on which carrier frequencies in the subset are selected for modulating information.

16. The method of claim 15, wherein the predetermined encoding includes interleaving data in a manner that does not depend on which carrier frequencies in the subset are selected for modulating information.

17. The method of claim 8, wherein at least some carrier frequencies not in the subset of carrier frequencies are used to modulate information according to a predetermined encoding that does not depend on which carrier frequencies in the subset are selected for modulating information.

18. The method of claim 17, wherein the predetermined encoding includes interleaving data in a manner that does not depend on which carrier frequencies in the subset are selected for modulating information.

19. The method of claim 17, wherein the carrier frequencies not in the subset are used for modulating information onto signals transmitted over the network regardless of whether any qualified electromagnetic waves is received in any frequency intervals.

20. The method of claim 17, wherein the selected carrier frequencies in the subset are used for modulating redundant information that corresponds to the information modulated on the carrier frequencies not in the subset.

21. The method of claim 20, wherein the selected carrier frequencies in the subset are used for modulating the redundant information if the information modulated on the carrier frequencies not in the subset is being broadcast to multiple stations in the network.

22. The method of claim 8, wherein the selected carrier frequencies in the subset are used for modulating information onto signals sent by a subset of the stations.

23. The method of claim 22, wherein the subset of the stations comprises stations that transmit the largest amount of data over the network.

24. The method of claim 22, wherein the subset of the stations comprises stations that transmit data over the network for the largest amount of time.

25. The method of claim 22, wherein the subset of the stations comprises stations that use the largest amount of a capacity over a communication medium shared by multiple stations in the network.

26. The method of claim 1, further comprising transmitting from a first station in the network to at least one other station in the network information characterizing the demand for capacity.

27. The method of claim 26, wherein the information characterizing the demand for capacity comprises information characterizing a demand for capacity by the first station.

28. The method of claim 1, further comprising transmitting from first a station in the network to at least one other station in the network information indicating whether an electromagnetic wave having a power above the threshold and a frequency in the frequency interval has been received.

29. The method of claim 28, wherein the information indicates whether the electromagnetic wave has been received at the first station.

30. The method of claim 28, wherein each station in the network monitors for reception of an electromagnetic wave that has a power above a threshold and a frequency in a predetermined frequency interval.

31. The method of claim 28, wherein selecting the carrier frequencies is performed in a distributed process by multiple of the stations in the network.

32. The method of claim 1, wherein a first station selects the carrier frequencies and broadcasts information specifying the selected carrier frequencies to other stations in the network.

33. The method of claim 32, wherein the first station selects the carrier frequencies based on whether the electromagnetic wave has been received at the first station.

34. The method of claim 32, wherein the first station selects the carrier frequencies based on whether the electromagnetic wave has been received at a station other than the first station.

35. The method of claim 1, wherein transmitting signals over the network comprises transmitting signals over a wired communication medium.

36. The method of claim 35, wherein the wired communication medium comprises a powerline network.

37. The method of claim 1, wherein the electromagnetic wave comprises a radio wave.

38. The method of claim 37, wherein the predetermined frequency interval comprises an amateur radio band.

39. The method of claim 37, wherein the radio wave has a frequency within a band regulated by a government agency.

40. An apparatus, comprising:

a monitoring module including circuitry for monitoring for reception of an electromagnetic wave that has a power above a threshold and a frequency in a predetermined frequency interval;

a modulation module including circuitry for modulating information onto signals transmitted over a network; and a carrier selection module including circuitry to select carrier frequencies for use by the modulation module, based at least in part on a demand by one or more stations in the network for capacity for communicating over the network, wherein carrier frequencies in the frequency interval are not selected for modulating information onto signals transmitted over the network if an electromagnetic wave having a power above the threshold and a frequency in the frequency interval has been received in a predetermined time interval.

* * * * *

UNITED STATES PATENT AND TRADEMARK OFFICE

CERTIFICATE OF CORRECTION

PATENT NO. : 7,904,021 B2
APPLICATION NO. : 11/614729
DATED : March 8, 2011
INVENTOR(S) : Lawrence W. Yonge, III It is certified that error appears in the above-identified patent and that said Letters Patent is hereby corrected as shown below:

In Column 12, Line 44, In Claim 28, delete “from first a” and insert -- from a first --

Signed and Sealed this
Tenth Day of May, 2011

David J. Kappos
*Director of the United States Patent and Trademark Office*